US007683988B2

(12) United States Patent
Lin et al.

(10) Patent No.: US 7,683,988 B2
(45) Date of Patent: Mar. 23, 2010

(54) TRANSFLECTIVE LIQUID CRYSTAL DISPLAY WITH GAMMA HARMONIZATION

(75) Inventors: Ching-Huan Lin, Hsin Ying (CN); Jenn-Jia Su, Budai Township, Chiayi County (TW); Chih-Ming Chang, Jhongli (TW)

(73) Assignee: AU Optronics, Hsinchu (TW)

( * ) Notice: Subject to any disclaimer, the term of this patent is extended or adjusted under 35 U.S.C. 154(b) by 904 days.

(21) Appl. No.: 11/432,157

(22) Filed: May 10, 2006

(65) Prior Publication Data

US 2007/0263144 A1 Nov. 15, 2007

(51) Int. Cl.
*G02F 1/1335* (2006.01)
*G02F 1/1343* (2006.01)
*G09G 3/30* (2006.01)
*G09G 3/36* (2006.01)

(52) U.S. Cl. .......................... 349/114; 349/38; 349/39; 345/80; 345/90

(58) Field of Classification Search ................ 349/114, 349/38, 39; 345/80, 90
See application file for complete search history.

(56) References Cited

U.S. PATENT DOCUMENTS

| | | | | |
|---|---|---|---|---|
| 4,714,983 | A | 12/1987 | Lang | 362/27 |
| 5,841,494 | A | 11/1998 | Hall | 349/98 |
| 6,008,871 | A | 12/1999 | Okumura | 349/61 |
| 6,124,905 | A | 9/2000 | Iijima | 349/62 |
| 6,199,989 | B1 | 3/2001 | Maeda et al. | 359/613 |
| 6,466,280 | B1 | 10/2002 | Park et al. | 349/43 |
| 6,508,560 | B2 | 1/2003 | Epstein et al. | 359/606 |
| 6,567,060 | B1 | 5/2003 | Sekiguchi | 345/87 |
| 6,567,141 | B1 | 5/2003 | Kaneko et al. | 349/117 |
| 6,574,044 | B1 | 6/2003 | Sahouani et al. | 359/498 |
| 6,577,361 | B1 | 6/2003 | Sekiguchi et al. | 349/96 |
| 6,580,480 | B2 | 6/2003 | Baek et al. | 349/114 |
| 6,606,139 | B2 | 8/2003 | Yoshii et al. | 349/114 |
| 6,608,660 | B1 | 8/2003 | Okamoto et al. | 349/113 |
| 6,611,305 | B2 | 8/2003 | Kamijo et al. | 349/112 |
| 6,628,369 | B2 | 9/2003 | Kumagai et al. | 349/194 |
| 6,697,138 | B2 * | 2/2004 | Ha et al. | 349/114 |
| 6,753,934 | B2 * | 6/2004 | Park et al. | 349/39 |
| 6,806,929 | B2 * | 10/2004 | Chen et al. | 349/114 |
| 6,850,298 | B2 * | 2/2005 | Fujimori et al. | 349/114 |
| 7,414,604 | B2 * | 8/2008 | Lin et al. | 345/94 |
| 2007/0064182 | A1 * | 3/2007 | Lin et al. | 349/114 |

* cited by examiner

*Primary Examiner*—Mike Qi
(74) *Attorney, Agent, or Firm*—Ware, Fressola, Van Der Sluys & Adolphson, LLP

(57) ABSTRACT

In a transflective liquid crystal display having a transmission area and the reflection area, the transmissive electrode is connected to a switching element to control the liquid crystal layer in the transmission area, and the reflective electrode is connected to the switching element via a separate capacitor to control the liquid crystal layer in the reflection area. The separate capacitor is used to shift the reflectance in the reflection area toward a higher voltage end in order to avoid the reflectance inversion problem. In addition, an adjustment capacitor is connected between the reflective electrode and a different common line. The adjustment capacitor is used to reduce or eliminate the discrepancy between the gamma curve associated with the transmittance and the gamma curve associated with the reflectance.

14 Claims, 14 Drawing Sheets

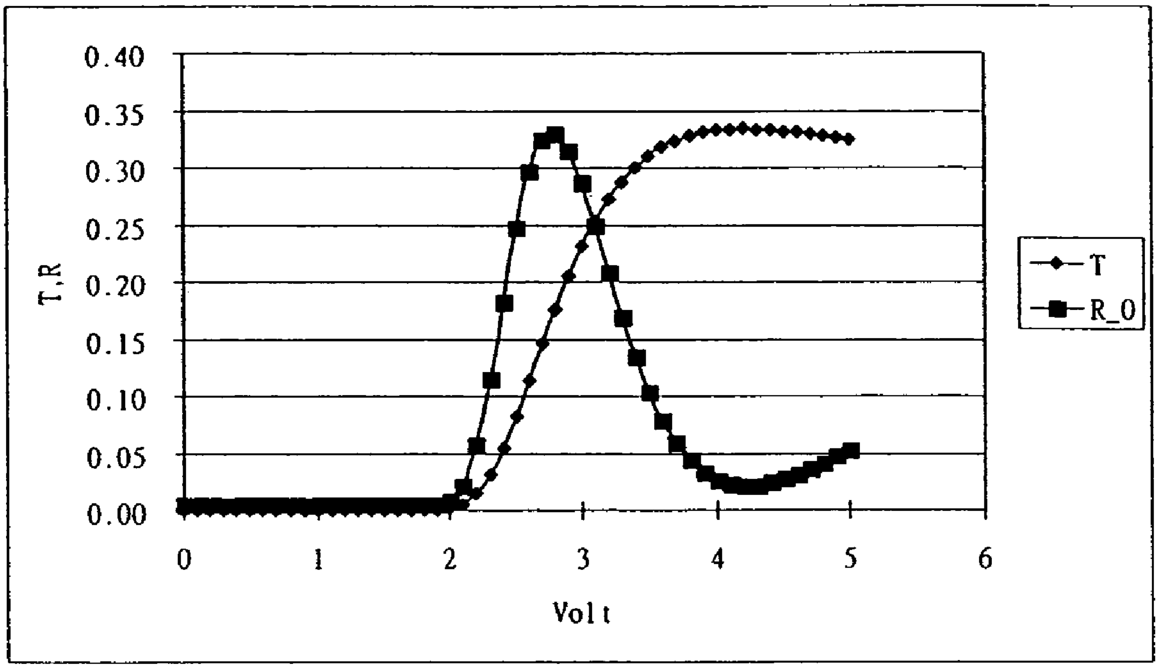
FIG. 5
FIG. 6
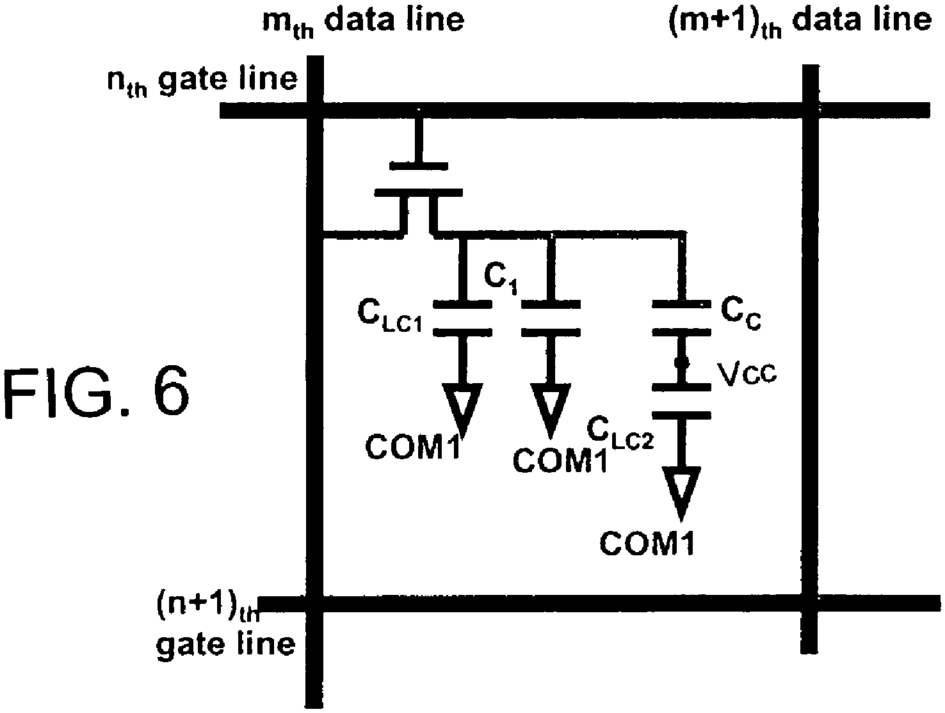

TRANSFLECTIVE LIQUID CRYSTAL DISPLAY WITH GAMMA HARMONIZATION

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective liquid crystal panel, and FIGS. 3*a* and 3*b* are cross sectional views of the pixel structure. As shown in FIG. 2, a pixel can be divided into three sub-pixels 12R, 12G and 12B, and each sub-pixel can be divided into a transmission area (TA) and a reflection area (RA). In the transmission area as shown in FIG. 3*a*, light from a back-light source enters the pixel area through a lower substrate 30 and goes through a liquid crystal layer, a color filter R and the upper substrate 20. In the reflection area, light from above an upper substrate 20 encountering the reflection area goes through the upper substrate 20, the color filter R and the liquid crystal layer before it is reflected by a reflective layer or electrode 52. Alternatively, a non-color filter (NCF) is formed on the upper substrate 20, corresponding to part of the reflective area, as shown in FIG. 3*b*.

As known in the art, there are many more layers in each pixel for controlling the optical behavior of the liquid crystal layer. These layers may include a device layer 50 and one or two electrode layers. For example, a transmissive electrode 54 on the device layer 50, together with a common electrode 22 on the color filter, is used to control the optical behavior of the liquid crystal layer in the transmission area. Likewise, the optical behavior of the liquid crystal layer in the reflection area is controlled by the reflective electrode 52 and the common electrode 22. The common electrode 22 is connected to a common line. The device layer is typically disposed on the lower substrate and comprises gate lines 31, 32, data lines 21-24 (FIG. 2), transistors, and passivation layers (not shown). Furthermore, a storage capacitor is commonly disposed in the device layer 50 to retain the electrical charge in the sub-pixel after a signal pulse in the gate line has passed. An equivalent circuit of a typical sub-pixel (m, n) having a transmission area and a reflection area is shown in FIG. 4. In FIG. 4, $C_{LC1}$ is the capacitance mainly attributable to the liquid crystal layer between the transmissive electrode 54 and the common electrode 22, and $C_{LC2}$ is the capacitance mainly attributable to the liquid crystal layer between the reflective electrode 52 and the common electrode 22. $C_1$ is the storage capacitor and COM denotes the common line.

As it is known in the art, an LCD panel also has quarter-wave plates and polarizers.

In a single-gap transflective LCD, one of the major disadvantages is that the transmissivity of the transmission area (transmittance, the V-T curve) and the reflectivity in the reflection area (reflectance, the V-R curve) do not reach their peak values in the same voltage range. As shown in FIG. 5, the V-R curve is peaked at about 2.8V, while the "flat" section of the V-T curve is between 3.7V and 5V. The reflectance experiences an inversion while the transmittance is approaching its higher values.

In prior art, this reflectivity inversion problem has been corrected by using a double-gap design wherein the gap at the reflection area is about half of the gap at the transmission area. While the double-gap design is effective in principle, it is difficult to achieve in practice mainly due to the complexity in the fabrication process. Other attempts, such as manipulating the voltage levels in the transmission and the reflection areas and coating the reflective electrode by a dielectric layer, have been proposed. For example, the voltage level in the reflection area relative to that in the transmission area is reduced by using capacitors. As shown in FIG. 6, a separate capacitor $C_C$ is connected in series to $C_{LC2}$. As such, the voltage level on the reflective electrode in reference to the common line voltage level $V_{COM1}$ is given by:

$$
\begin{aligned}
V_{CLC2} &= Vcc - Vcom1 \\
&= \frac{Cc}{(C_{LC2} + Cc)} * (V_{data} - Vcom1)
\end{aligned}
$$

where $V_{data}$ is the voltage level on the data line.

By adjusting the ratio $C_C/(C_{CL2}+C_C)$, it is possible to shift the peak of the reflectance curve toward the higher voltage end so as to match the flatter region of the transmittance curve, as shown in FIG. 7*a*. As such, the inversion in the reflectance relative to the transmittance can be avoided.

However, while the transmittance starts to increase rapidly at about 2.2V, the reflectance remains low until about 2.8V. In this low brightness region, the discrepancy in the transmittance and reflectance also causes the discrepancy between the gamma curve associated with the transmittance and the gamma curve associated with the reflectance, as shown in FIG. 7*b*. FIG. 7*b* shows the transmittance and reflectance as a function of gamma level. Such discrepancy in the gamma curves degrades the view quality of a transflective LCD panel.

It is thus advantageous and desirable to provide a method to reduce the discrepancy between the gamma curve associated with the transmittance and the gamma curve associated with the reflectance.

SUMMARY OF THE INVENTION

The present invention provides a method and a pixel structure to improve the viewing quality of a transflective-type liquid crystal display. The pixel structure of a pixel in the liquid crystal display comprises a plurality of sub-pixel segments, each of which comprises a transmission area and a reflection area. In the sub-pixel segment, a data line, a gate line, a common line connected to a common electrode, and a switching element operatively connected to the data line and the gate line are used to control the operational voltage on the liquid crystal layer areas associated with the sub-segment. The transmission area has a transmissive electrode and the reflection area has a reflective electrode. The transmissive electrode is connected to the switching element to control the liquid crystal layer in the transmission area. The reflective electrode is connected to the switching element via a separate capacitor to control the liquid crystal layer in the reflection area. The separate capacitor is used to shift the reflectance in the reflection area toward a higher voltage end in order to avoid the reflectance inversion problem. In addition, an adjustment capacitor is connected between the reflective electrode and a different common line. The adjustment capacitor is used to reduce or eliminate the discrepancy between the gamma curve associated with the transmittance and the gamma curve associated with the reflectance.

The present invention will become apparent upon reading the description taken in conjunction of FIGS. 8 to 16.

BRIEF DESCRIPTION OF THE DRAWINGS

FIG. 5 is a plot of transmittance (T) and reflectance (R) against applied voltage (V) in a prior art single-gap transflective LCD.

FIG. 6 is an equivalent circuit of a sub-segment segment in a transflective LCD wherein a separate capacitor is connected to the reflective electrode to reduce the voltage level thereon.

DETAILED DESCRIPTION OF THE INVENTION

Figure 1:
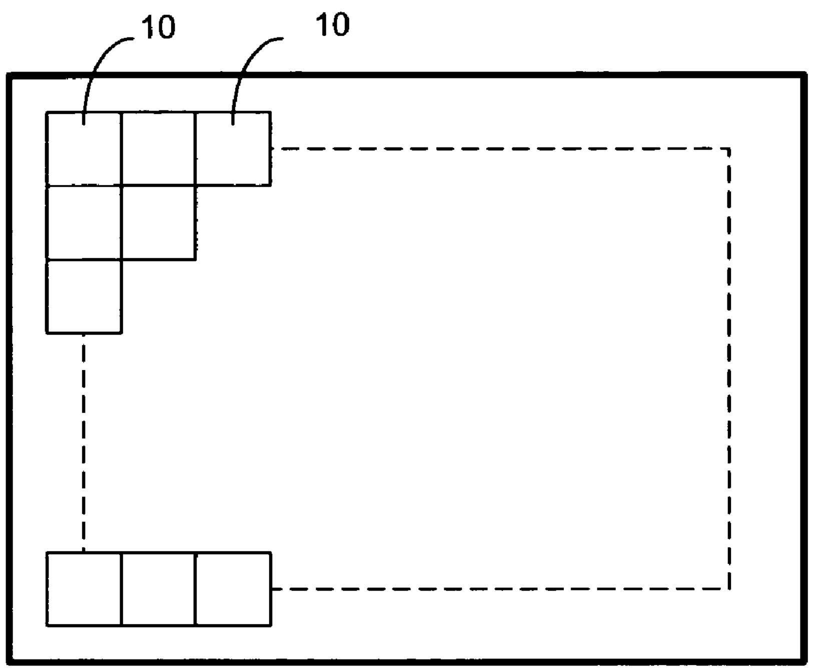
FIG. 1 (prior art)
FIG. 1 is a schematic representation showing a typical LCD display.
Figure 2:
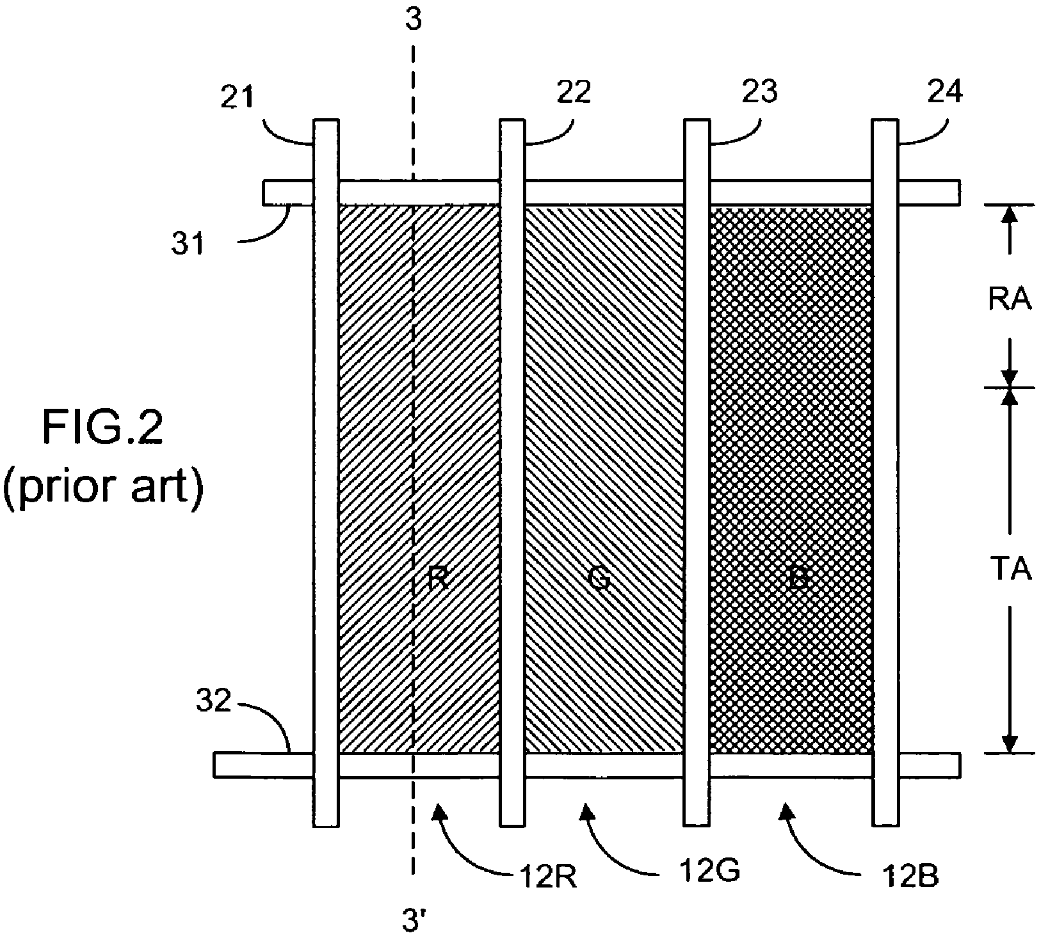
FIG.2 (prior art)
FIG. 2 is a plan view showing the pixel structure of a conventional transflective color LCD display.
Figure 3A:
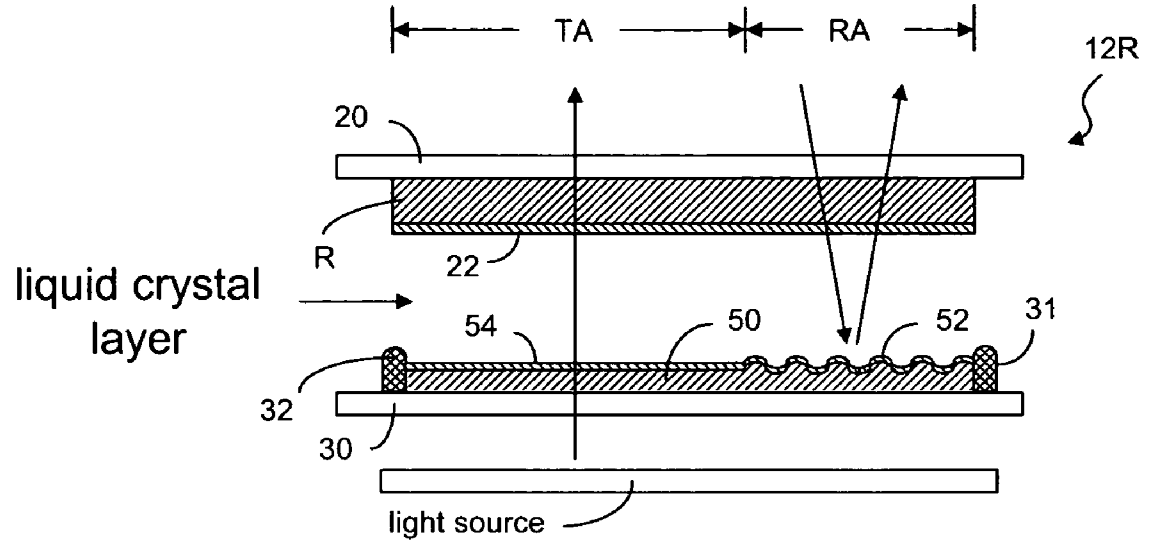
FIG.3a (prior art)
FIG. 3*a* is a cross sectional view showing the reflection and transmission of light beams in the pixel as shown in FIG. 2.
Figure 3B:
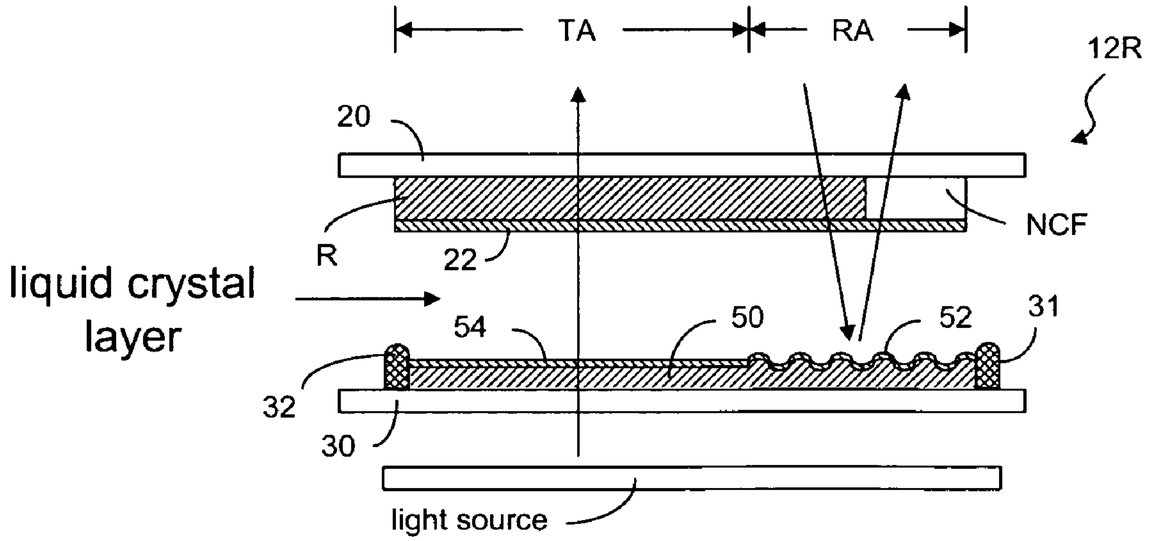
FIG.3b (prior art)
FIG. 3*b* is a cross sectional view showing the reflection and transmission of light beams in another prior art transflective display.
Figure 4:
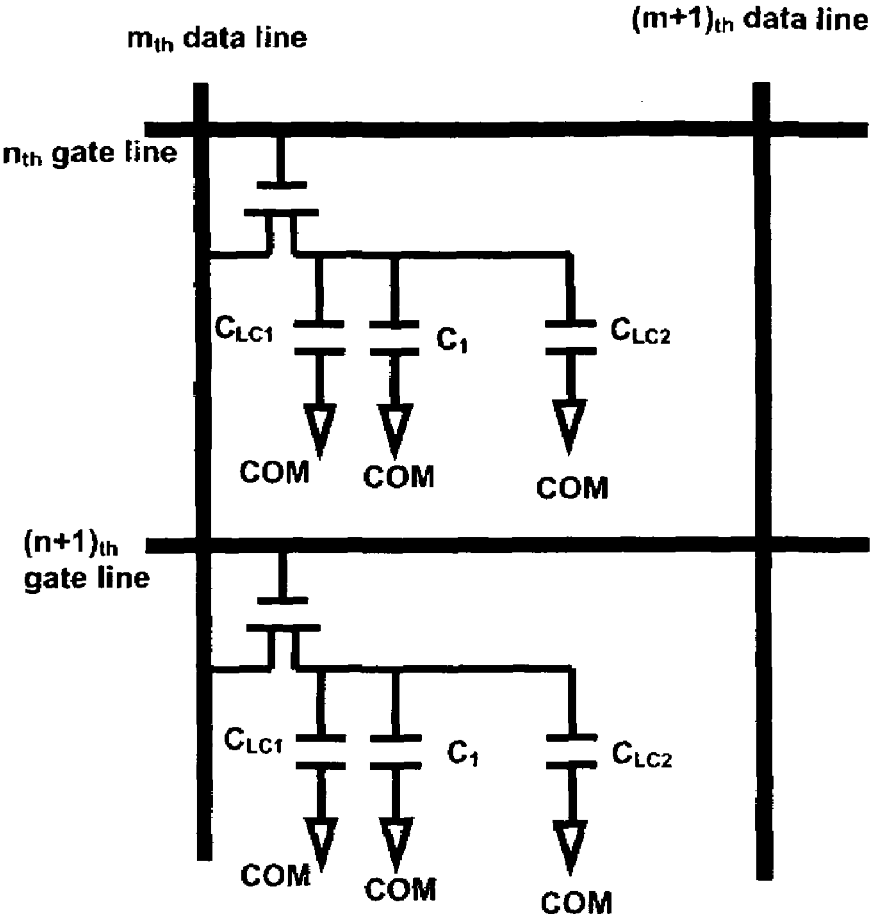
FIG. 4 is an equivalent circuit of a sub-pixel segment in a transflective LCD panel.
Figure 8:
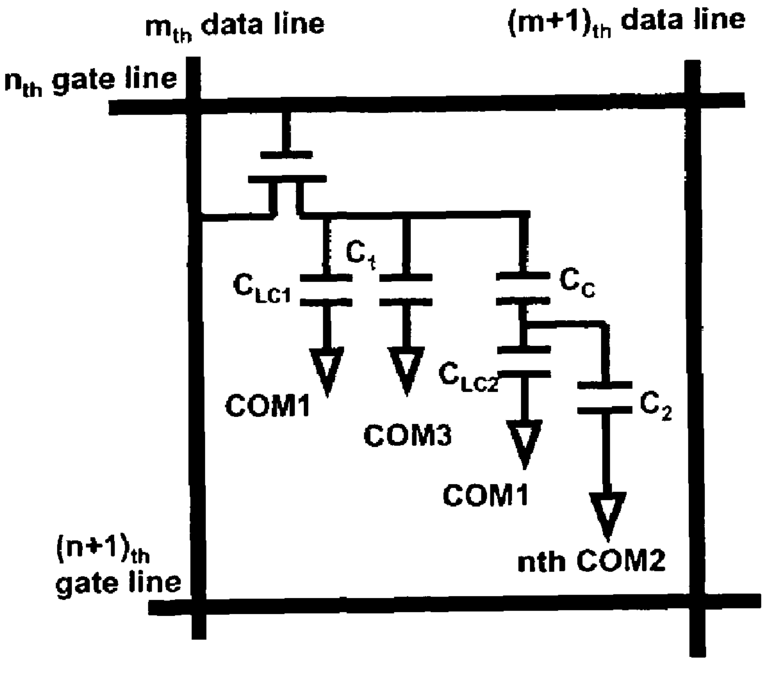
FIG. 8 is an equivalent circuit of a sub-pixel segment, according to the present invention.
Figure 7A:
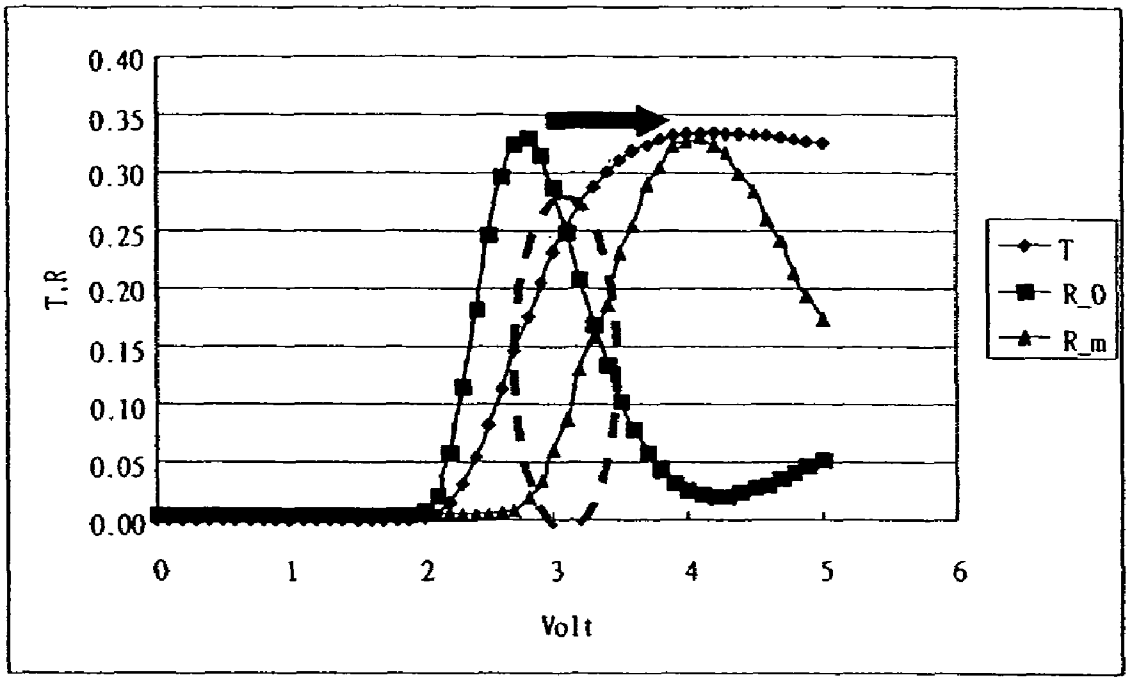
FIG. 7*a* is a plot of transmittance (T) and reflectance (R) against applied voltage (V) showing the shifting of the R-V curve as a result of the separate capacitor in the reflection area.
Figure 7B:
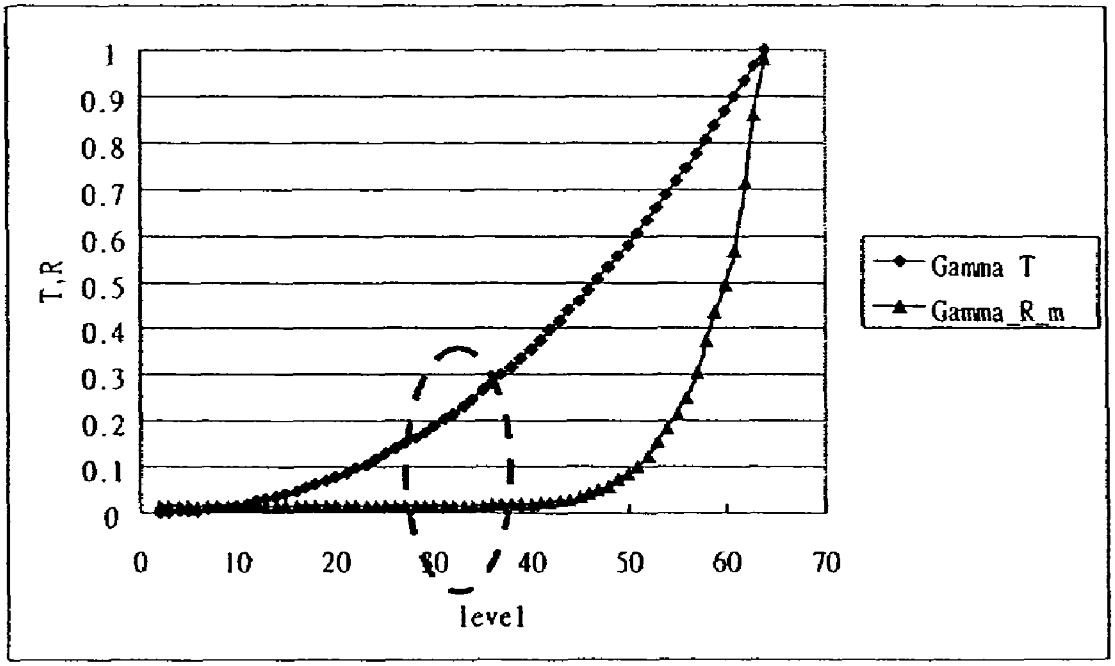
FIG. 7*b* is a plot of transmittance and reflectance as a function of gamma level.

A sub-pixel segment, according to one embodiment of the present invention, is illustrated in the equivalent circuit of FIG. 8. As with a sub-pixel segment in a prior art transflective LCD display, the sub-pixel segment (m, n), according to the present invention, has a transmission area and a reflection area jointly controlled by the $n^{th}$ gate line and the $m^{th}$ data line via a switching element. The sub-pixel segment has a common electrode connected to a common line COM1. The optical behavior of the liquid crystal layer in the reflection area is controlled by the reflective electrode and the common electrode. A storage capacitor $C_1$ is used to retain the electrical charge in the sub-pixel segment after a signal pulse in the gate line has passed.

In FIG. 8, $C_{LC1}$ is the capacitance mainly attributable to the liquid crystal layer between the transmissive electrode and the common electrode, and $C_{LC2}$ is the capacitance mainly attributable to the liquid crystal layer between the reflective electrode and the common electrode. In addition, a separate capacitor $C_C$ is connected in series to $C_{LC2}$ in order to shift the reflectance in the reflection area toward a higher voltage end in order to avoid the reflectance inversion problem. Furthermore, an adjustment capacitor $C_2$ is connected between the reflective electrode and a different common line nth COM2. The adjustment capacitor is used to reduce or eliminate the discrepancy between the gamma curve associated with the transmittance and the gamma curve associated with the reflectance. With such an adjustment capacitor $C_2$, the voltage level on the reflective electrode in reference to the common line voltage $V_{COM1}$ is given by:

$$V_{CLC2} = Vcc - Vcom1$$

$$= \frac{Cc*(V_{data} - Vcom1) + (Cc + C_2)*(\text{nth\_Vcom2} - Vcom1)}{(C_{LC2} + Cc + C_2)}$$

In FIG. 8, COM3 can be the same as COM1 or different from COM1.

Figure 9:
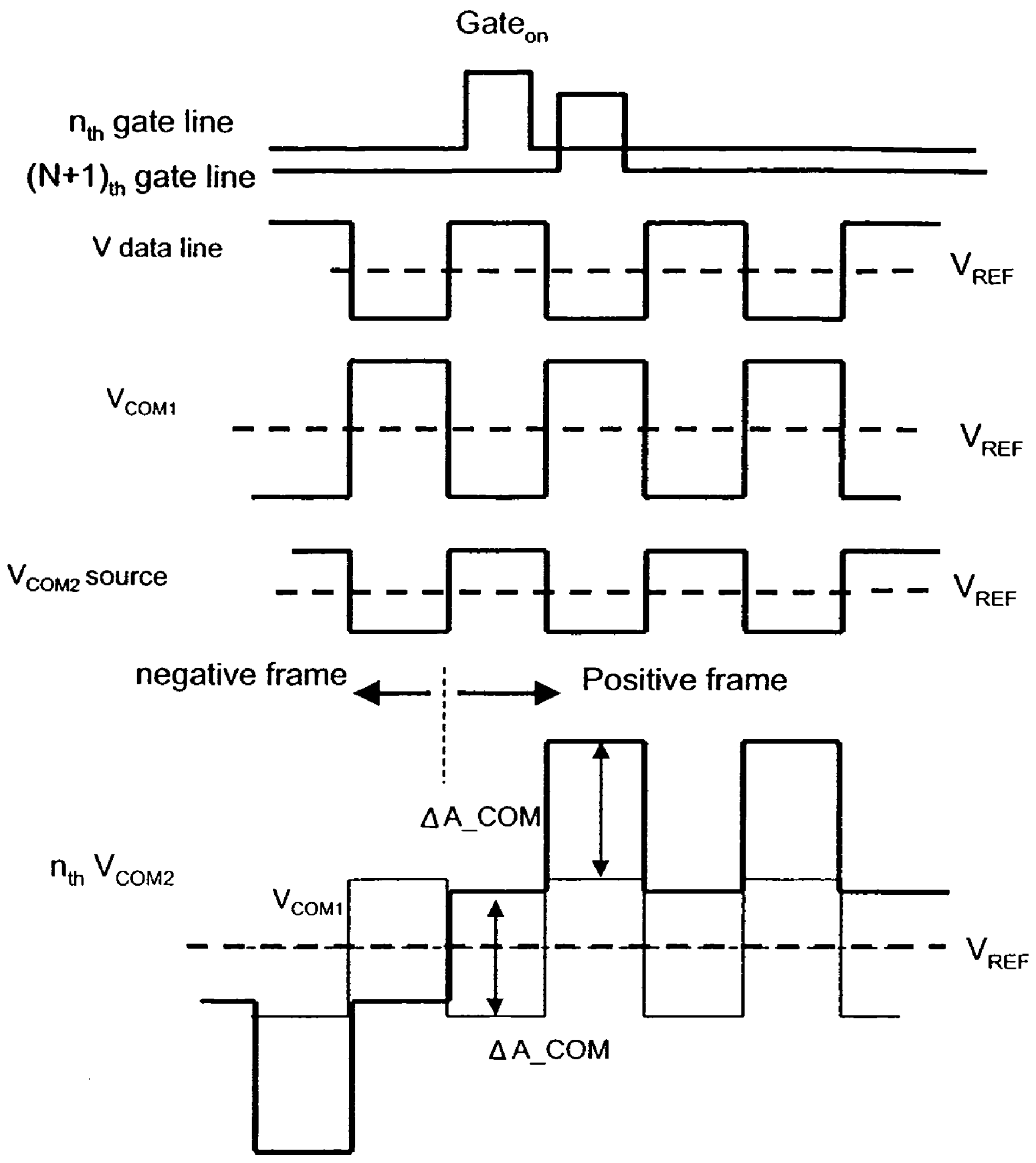
FIG. 9 is a timing chart showing the signals at two common lines in relationship to the gateline signal and the data line signal.

The nth $V_{COM2}$ signal on the common line COM2 is shown in FIG. 9. In FIG. 9, the dashed line denotes a reference voltage level $V_{REF}$. As shown, both the $V_{COM1}$ signal on the common line COM1 and the $V_{COM2}$ source signal are AC signals. While the $V_{COM1}$ signal is substantially 180° out of phase with the data signals on Data line n, the $V_{COM2}$ source signal is substantially in phase with the Data line n. It should be noted that the common line COM2 is a floating electrode and, therefore, the shape of nth $V_{COM2}$ signal is dependent upon $V_{COM1}$ and upon the driving mode. For example, when the driving mode is in accordance with a line inversion scheme, the nth $V_{COM2}$ signal has a step-like shape as shown in FIG. 9. In a negative frame, the nth $V_{COM2}$ signal is, in general, is negative but its amplitude fluctuation follows the shape of $V_{COM1}$. When nth gate line is turned on again and the frame is positive, the $n^{th}$ $V_{COM2}$ is refreshed and changes polarity from negative to positive in a pixel. The shape of the nth $V_{COM2}$ remains the same until the next frame.

As seen in the above equation, it is possible to adjust the values of $C_C$ and $C_2$ to improve the viewing quality of a transflective LCD panel. For example, it is possible to select $C_C$ and $C_2$ such that $$C_C/(C_C+C_{LC2}+C_2)=0.46,$$

and $C_2/(C_C+C_{LC2}+C_2)=0.32$.

Figure 10A:
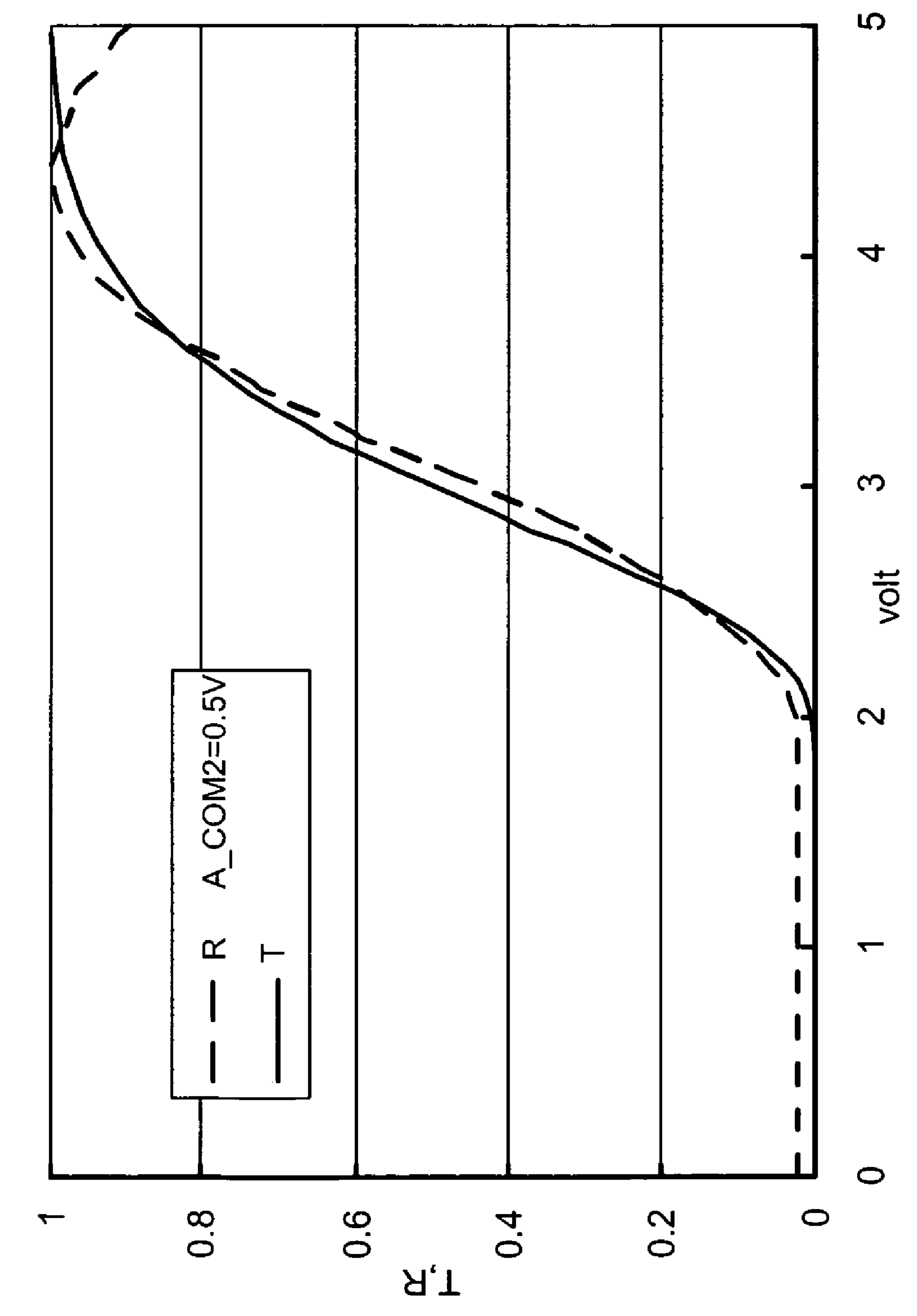
FIG. 10*a* is a plot of transmittance and reflectance against applied voltage in a sub-pixel segment, according to the present invention.
Figure 10B:
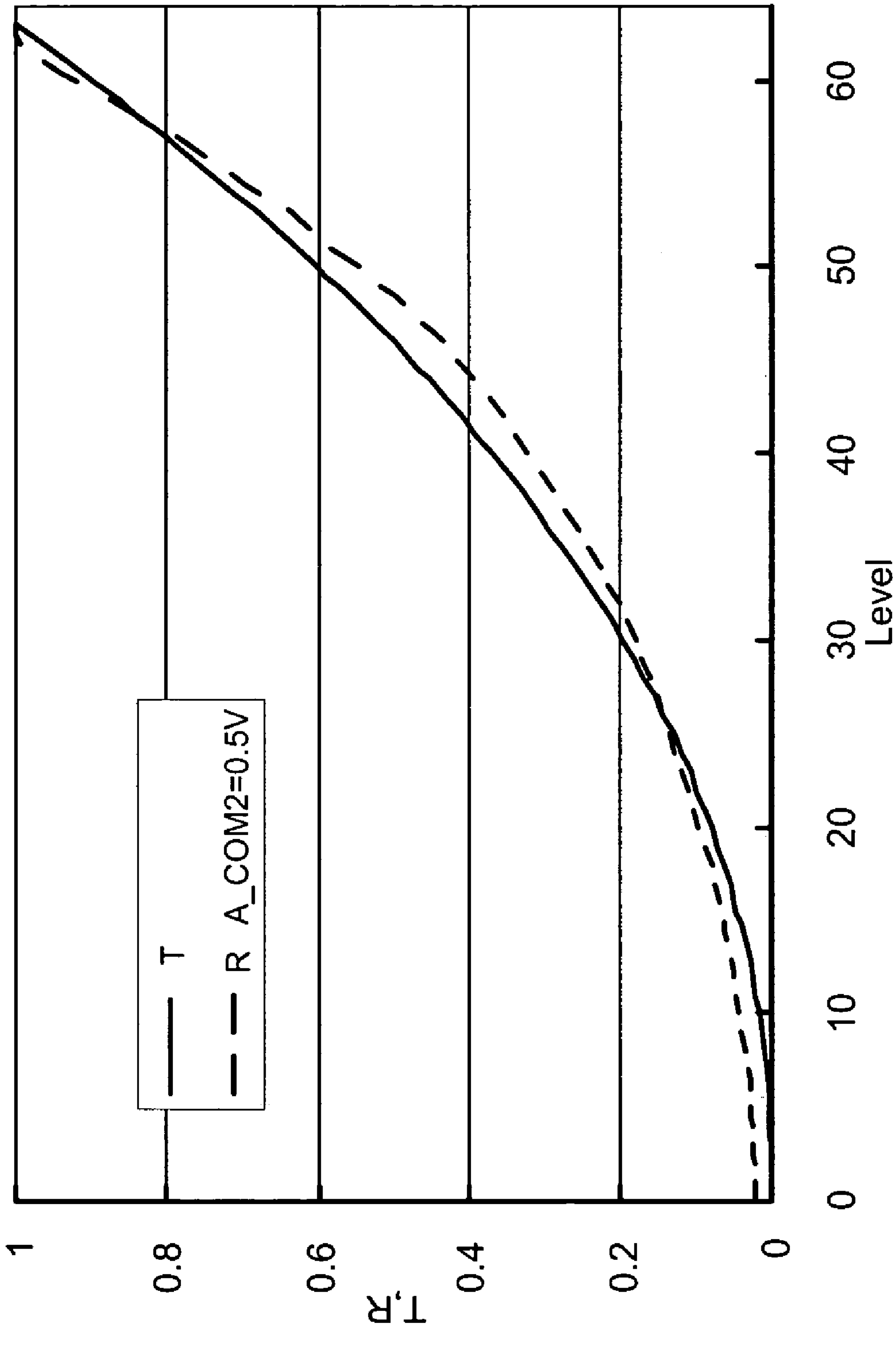
FIG. 10*b* is a plot of transmittance and reflectance as a function of gamma level, according to the present invention.

With ΔA_COM=3V (ΔA_COM being the absolute value of the amplitude difference between nth $V_{COM2}$ and $V_{COM1}$), the matching between the transmittance and reflectance is shown in FIG. 10*a*. As can be seen in FIG. 10*a*, not only the peak of the reflectance curve reasonably matches the flatter segment of the transmittance curve at about 4.0V, the slope of the transmittance curve and the slope of the reflectance curve from 2V to 4V region are reasonably close to each other. Based on a 64-level transmittance gamma curve with an index of 2.2, or $T=(n/64)^{2.2}$, a reflectance gamma curve is obtained as shown in FIG. 10*b*. As can be seen, the discrepancy between the transmittance gamma curve and the reflectance gamma curve is greatly reduced.

Figure 11:
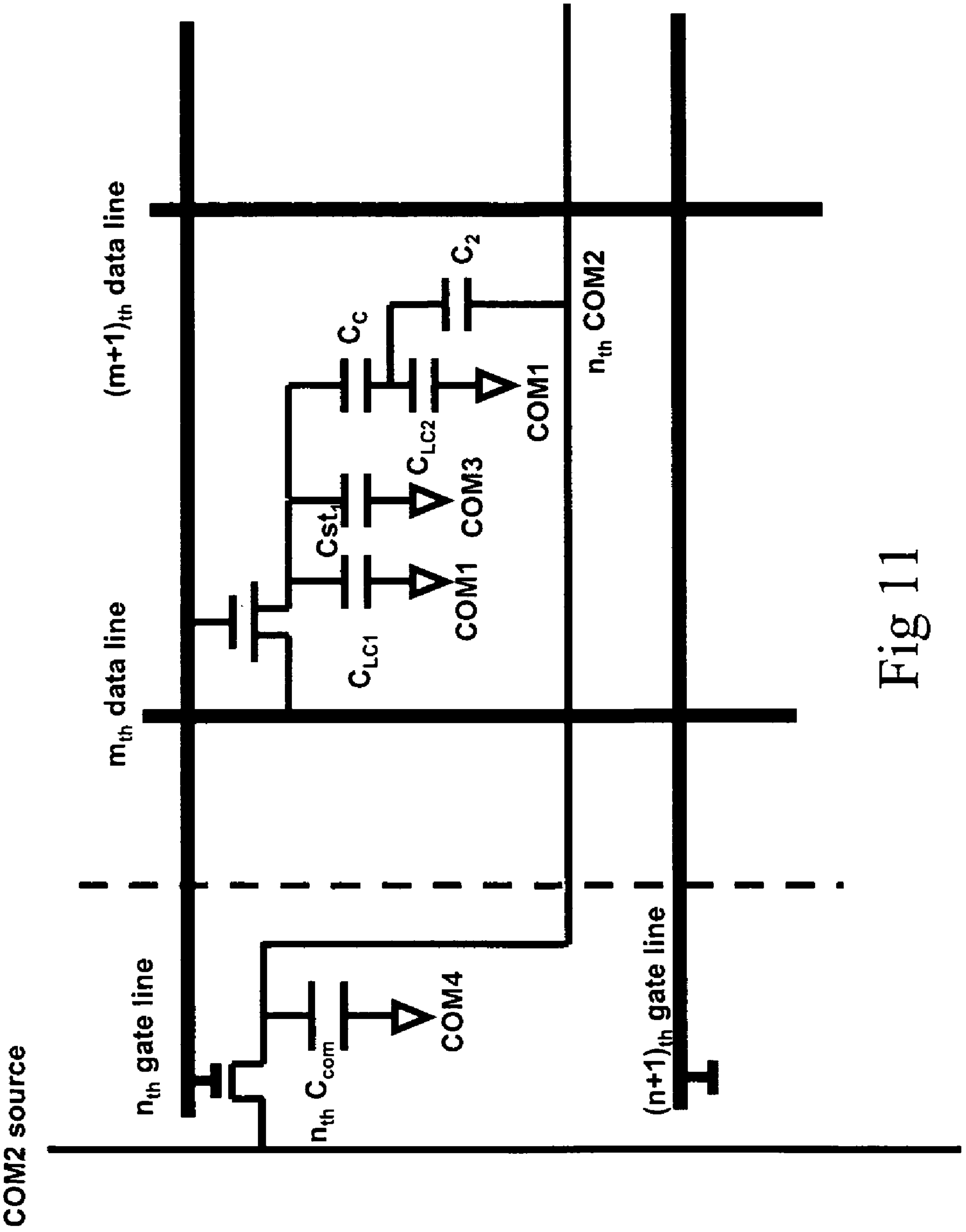
FIG. 11 is an equivalent circuit of the transflective LCD display showing the driving scheme of COM2, according to the present invention.
Figure 12:
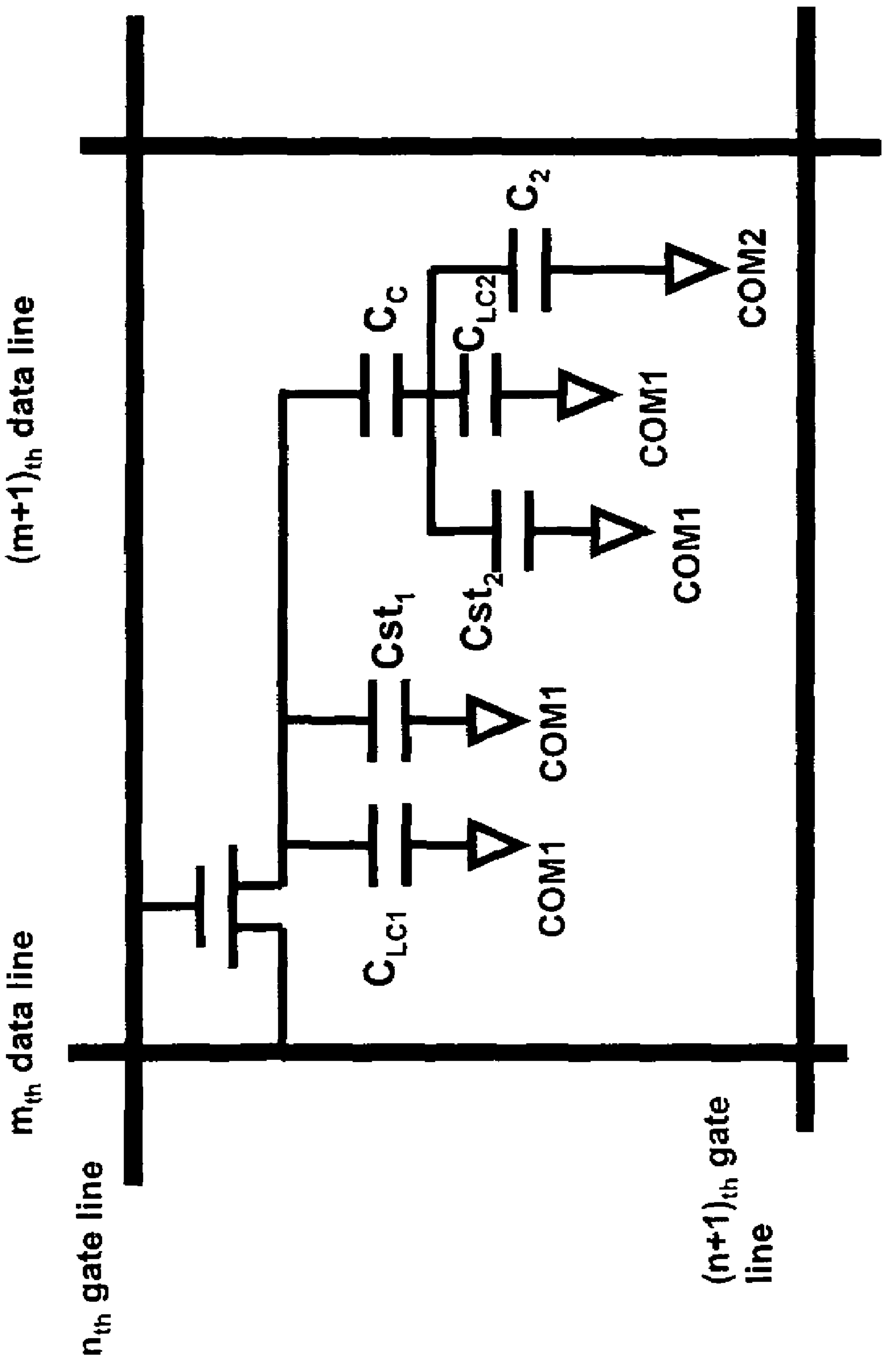
FIG. 12 is an equivalent circuit of the sub-pixel segment, according to another embodiment of the present invention.
Figure 13:
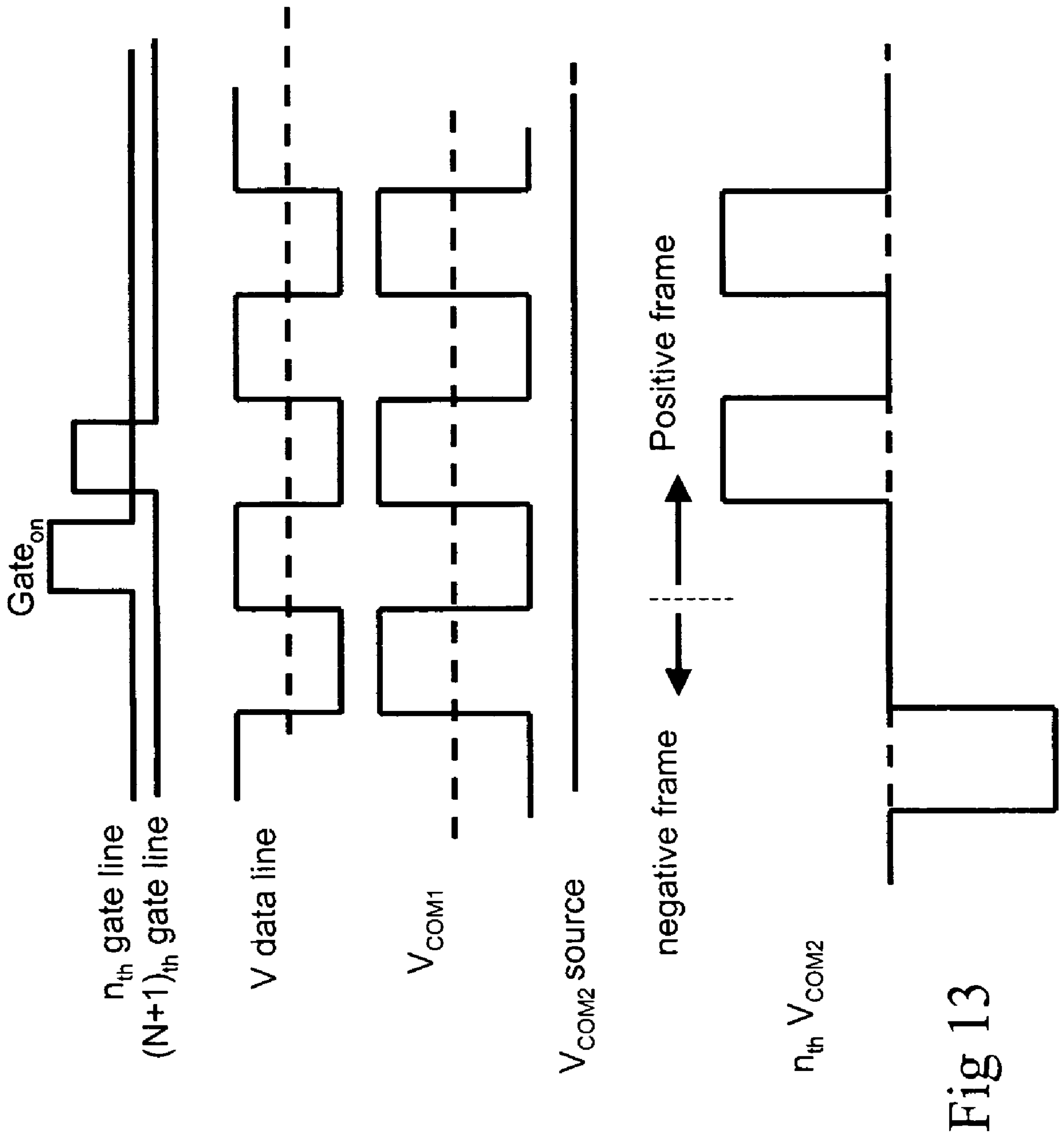
FIG. 13 is a timing chart showing the signal at COM2, according to a different embodiment of the present invention.

The nth $V_{COM2}$ signal as shown in FIG. 9 is used for a swing type display in order to achieve a pixel inversion effect. Such a swing type nth $V_{COM2}$ can be realized by using the driving scheme as shown in FIG. 11. As shown in FIG. 11, the adjustment capacitor $C_2$ is electrically connected to a common voltage source COM2 through another switching element for receiving nth $V_{COM2}$. In FIG. 11, V_COM1, $V_{13}$ COM3 and V_COM4 can be the same or different. Conveniently, only one switching element outside the display area is used to provide the nth $V_{COM2}$ signal for an entire line n. Furthermore, a common capacitor $C_{COM}$ electrically connected to the switching element for stabilizing the voltage signal at the second common electrode nth COM2. In FIGS. 8 and 11, only a common storage capacitor $C_1$ is used for both the transmission area and the reflection area in a sub-pixel segment. However, it is possible to have two storage capacitors $C_{ST1}$ and $C_{ST2}$ in a sub-pixel segment, separately storing the electric charge in the transmission area and the reflection area, as shown in FIG. 12. Moreover, it is possible to use a constant $V_{COM2}$ signal, as shown in FIG. 13, rather than the swing type signal of FIG. 9.

Figure 14:
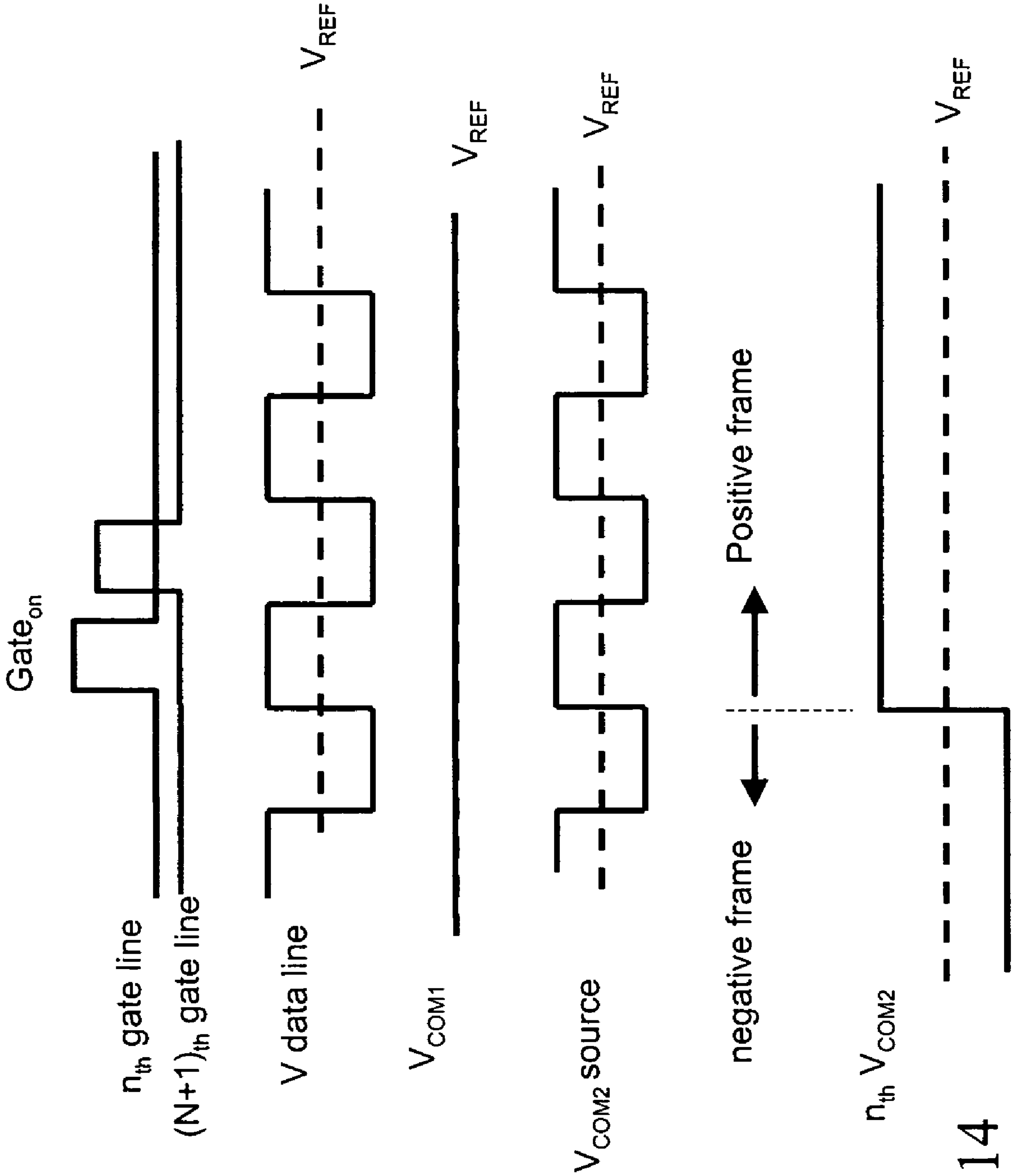
FIG. 14 is a timing chart showing the signals at COM1 and COM2, according to another embodiment of the present invention.
Figure 15:
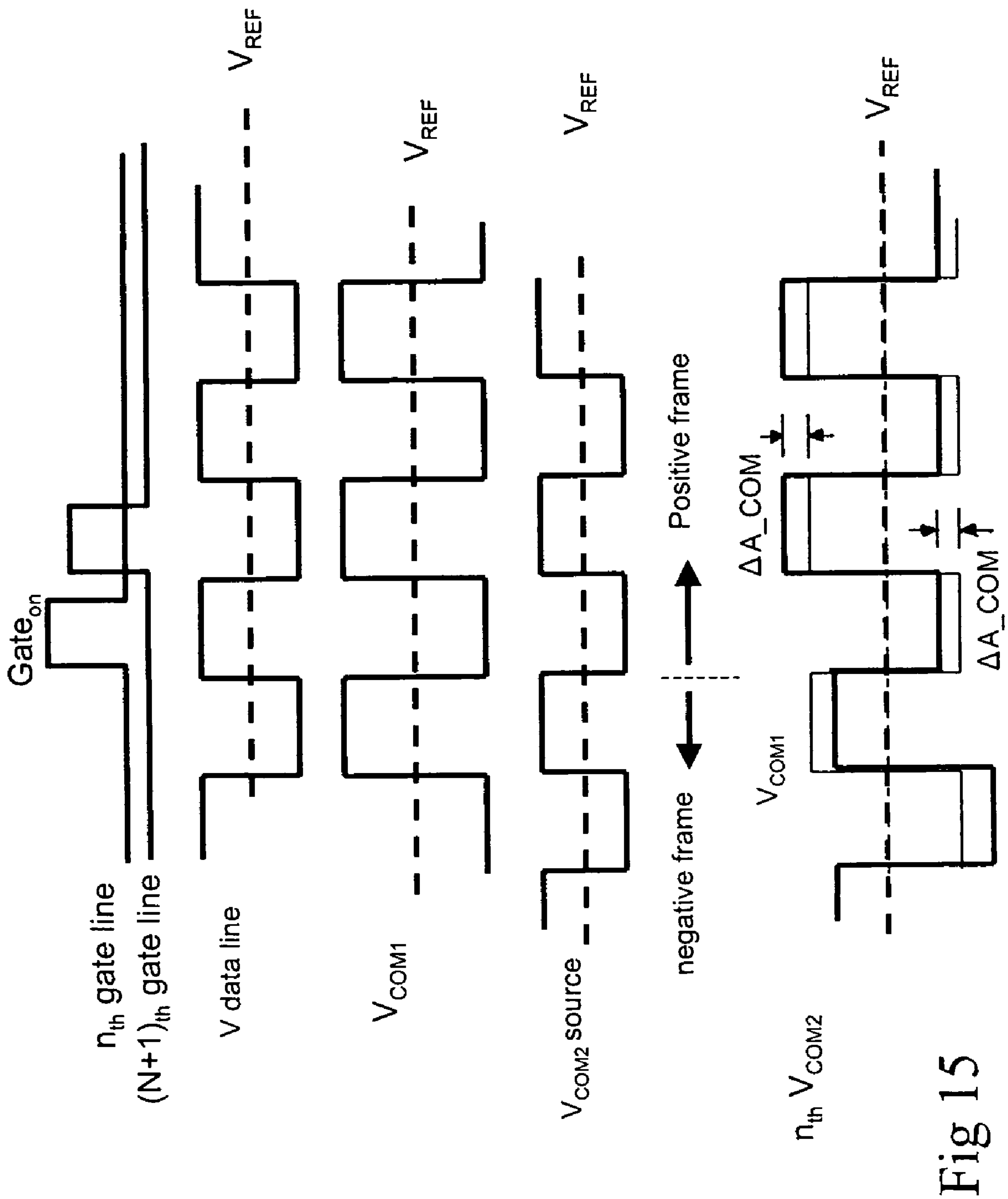
FIG. 15 is a timing chart showing the signals at COM1 and COM2, according to yet another embodiment of the present invention.

In a different embodiment of the present invention, while the swing type nth $V_{COM2}$ is used, $V_{COM1}$ is a constant voltage, as shown in FIG. 14. In yet another embodiment of the present invention, both $V_{COM1}$ and nth $V_{COM2}$ are 180° out of phase with Data line n. Thus, $V_{COM1}$ is in phase with nth $V_{COM2}$, as shown in FIG. 15.

Figure 16:
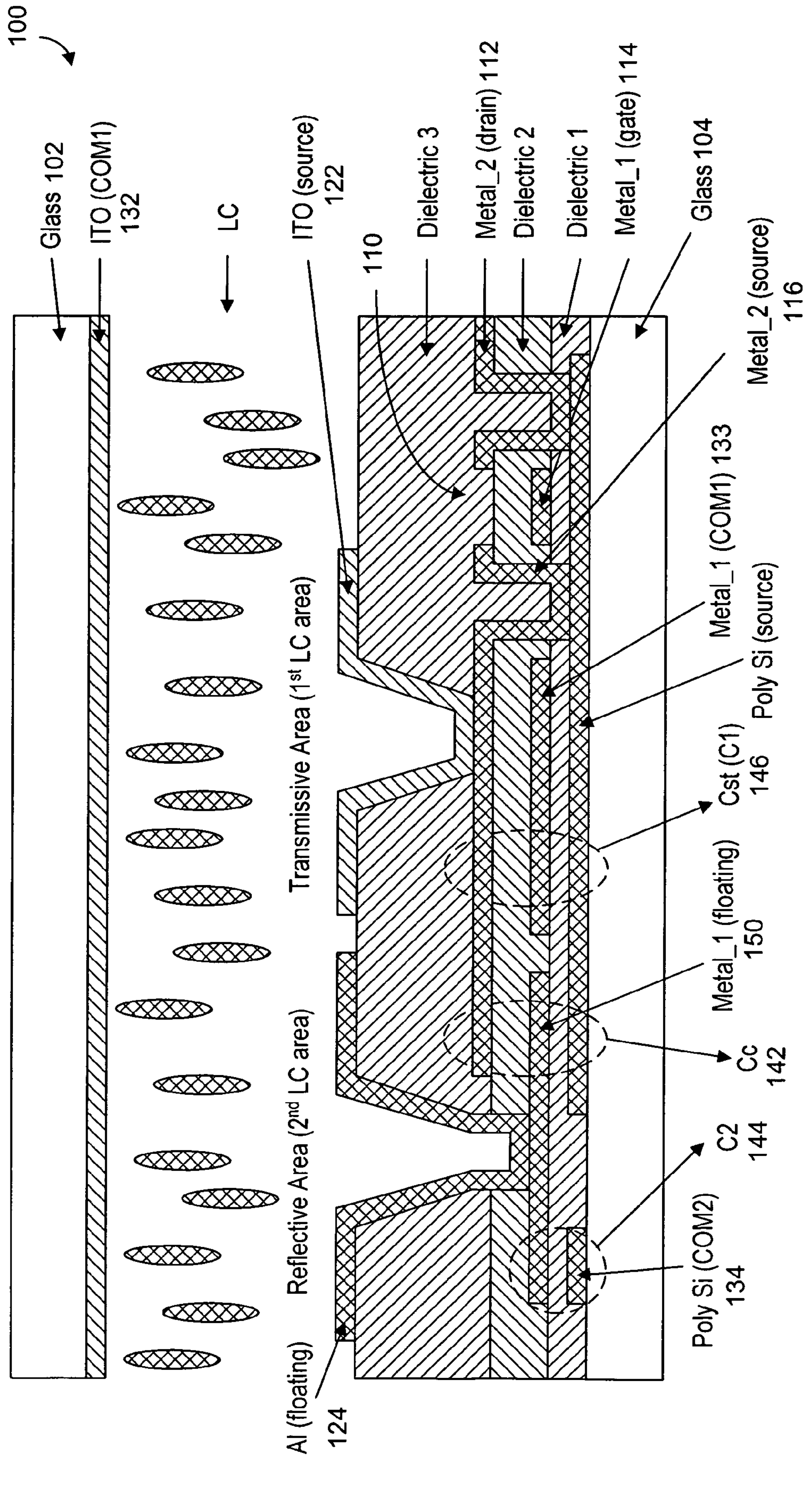
FIG. 16 is a cross sectional view showing the layer structure in the lower substrate in a transflective LCD sub-pixel segment, according to the present invention.

The use of adjustment capacitors to achieve harmonization between the transmittance gamma and the reflectance gamma can be implemented in an Active Matrix transflective liquid crystal display (AM TRLCD) panel without significantly increasing the complexity in the fabrication process. As shown in FIG. 16, a polysilicon layer (Poly Si) is formed on the lower substrate 104 of a pixel 100. The pixel 100 also has a first common electrode 132 (COM1) formed on the upper substrate 102. Both the upper and lower substrates are usually made of glass plates. Part of the polysilicon layer is used as a second common electrode 134 (COM2) and part of the polysilicon layer is used in a switching unit 110. A first metal layer (Metal_1), which is electrically isolated from the polysilicon layer by a first dielectric layer (Dielectric_1), is used to form the gate terminal 114 of the switching unit 110; one end of a storage capacitor 146 (C1); one end of the coupling capacitor 142 and one end of the adjustment capacitor 144 (C2). A second metal layer (Metal_2), which is electrically isolated from the first metal layer by a second dielectric layer (Dielectric_2), is used to form the drain terminal 112 and the source terminal 116 of the switching unit 110; an electrical connector to the pixel electrode 122; the other end of the storage capacitor 146; and the other end of the coupling capacitor 142. As shown in FIG. 16. the pixel electrode 122 and part of the first common electrode 132 forms a first liquid crystal capacitor ($C_{LC1}$, see FIG. 8), and a floating electrode 124 and another part of the first common electrode 132 forms a second liquid crystal capacitor ($C_{LC2}$, see FIG. 8). Thus, the adjustment capacitor 144 can be realized by adding a common line COM2 on the lower substrate. By using a floating metal layer Metal_1, both the coupling capacitor $C_c$ and the adjustment capacitor $C_2$ can be achieved.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A liquid crystal display, comprising:

a plurality of data lines for conveying a data signal;

a plurality of gate lines for providing a driving signal; and a plurality of pixels, each pixel comprising:

- a switching unit, responsive to the driving signal from a gate line, for admitting the data signal from a data line;
- a first common electrode for providing a first common voltage signal;
- a second common electrode for providing a second common voltage signal;
- a pixel electrode, electrically connected to the switching unit, for driving a liquid crystal layer within the pixel based on the admitted data signal and the first common voltage signal;
- a first liquid crystal capacitor having a first end electrically connected to the first common electrode, and a second end electrically connected to the pixel electrode;
- an coupling capacitor having a first terminal and a second terminal, wherein the first terminal is electrically connected to the pixel electrode;
- an adjustment capacitor having a first end electrically connected to the second common electrode and a second end connected to the second terminal of the coupling capacitor; and
- a second liquid crystal capacitor having a first end electrically connected to the first common electrode, and a second end electrically connected to the second terminal of the coupling capacitor, for driving the liquid crystal layer based on the admitted data signal, the first common voltage signal and the second common voltage signal.

2. The liquid crystal display of claim 1, further comprising a storage capacitor connected in parallel to the first liquid crystal capacitor in said each pixel.

3. The liquid crystal display of claim 1, further comprising a storage capacitor connected in parallel to the second liquid crystal capacitor in said each pixel.

4. The liquid crystal display of claim 1, wherein, in said each pixel, the first liquid crystal capacitor has two electrode ends, each of which is made of substantially transparent material, and the second liquid crystal capacitor has a first electrode end made of substantially transparent material and a second electrode end made of a reflective material.

5. The liquid crystal display of claim 1, wherein, in said each pixel, the second liquid crystal capacitor has two electrode ends, each of which is made of substantially transparent material, and the first liquid crystal capacitor has a first electrode end made of substantially transparent material and a second electrode end made of a reflective material.

6. The liquid crystal display of claim 1, further comprising:

a voltage source for providing the second common voltage signal; and an additional switching unit, responsive to the driving signal from said gate line, for electrically connecting the second common electrode in said each pixel to the voltage source.

7. The liquid crystal display of claim 6, further comprising a further capacitor electrically connected to the second common electrode in said each pixel for stabilizing a voltage at the second common electrode.

8. The liquid crystal display of claim 7, wherein the further capacitor has a first end electrically connected to the second common electrode and a second end electrically connected to the first common electrode.

9. The liquid crystal display of claim 6, wherein each of the first and second common voltage signals is a constant voltage signal or an alternating current voltage signal.

10. The liquid crystal display of claim 6, wherein the first common voltage signal and the second common voltage signal are alternating current signals 180 degrees out of phase with each other.

11. The liquid crystal display of claim 6, wherein the first common voltage signal and the second common voltage signal are alternating current signals in phase with each other.

12. The liquid crystal display of claim 6, wherein the second common voltage signal comprises a constant voltage signal.

13. The liquid crystal display of claim 1, wherein the first end of the first liquid crystal capacitor comprises a first transparent electrode and the second end of the first liquid crystal capacitor comprises a second transparent electrode, and wherein the first end of the second liquid crystal capacitor comprises a transparent electrode and the second end of the second liquid crystal capacitor comprises a reflective electrode.

14. The liquid crystal display of claim 13, further comprising:

a voltage source for providing the second common voltage signal;

an additional switching unit, responsive to the driving signal from said gate line, for electrically connecting the second common electrode in said each pixel to the voltage source; and a further capacitor electrically connected to the second common electrode for stabilizing a voltage at the second common electrode.

* * * * *

UNITED STATES PATENT AND TRADEMARK OFFICE

CERTIFICATE OF CORRECTION

PATENT NO. : 7,683,988 B2
APPLICATION NO. : 11/432157
DATED : March 23, 2010
INVENTOR(S) : Ching-Huan Lin et al.

It is certified that error appears in the above-identified patent and that said Letters Patent is hereby corrected as shown below:

Title page, item 73, should read as follows:

*Assignee*: *AU Optronics Corporation*

Signed and Sealed this
Twenty-sixth Day of July, 2011

David J. Kappos
*Director of the United States Patent and Trademark Office*